US012613949B2

(12) United States Patent
Joshi et al.

(10) Patent No.: US 12,613,949 B2
(45) Date of Patent: Apr. 28, 2026

(54) SYSTEM AND METHOD TO ENHANCE PIN SECURITY BY ADDING HIDDEN FACTORS

(71) Applicant: THALES DIS CPL USA, INC., Austin, TX (US)

(72) Inventors: Pankaj Joshi, Ottawa (CA); Asad Mahboob Ali, Austin, TX (US)

(73) Assignee: THALES DIS CPL USA, INC., Austin, TX (US)

( * ) Notice: Subject to any disclaimer, the term of this patent is extended or adjusted under 35 U.S.C. 154(b) by 85 days.

(21) Appl. No.: 18/621,393

(22) Filed: Mar. 29, 2024

(65) Prior Publication Data

US 2025/0307363 A1 Oct. 2, 2025

(51) Int. Cl.
*G06F 21/32* (2013.01)
*G06F 21/00* (2013.01)

(52) U.S. Cl.
CPC ................................... *G06F 21/32* (2013.01)

(58) Field of Classification Search
CPC ........ G06F 21/32; G06F 21/31; G06F 21/316; G06F 21/36; G06F 21/45; G06F 21/46; G06F 21/30; G06F 21/44
See application file for complete search history.

(56) References Cited

U.S. PATENT DOCUMENTS

2009/0259588 A1* 10/2009 Lindsay .................. G06F 21/31
                                                          705/40
2014/0095388 A1* 4/2014 Colnot ................. G06Q 20/425
                                                          705/44

2016/0210452 A1* 7/2016 Pahud ................. G06F 3/04883
2019/0130091 A1 5/2019 Jayakumar

FOREIGN PATENT DOCUMENTS

WO        WO2015148048 A1 10/2015

OTHER PUBLICATIONS

International Search Report (PCT/ISA/210) and Written Opinion (PCT/ISA/237) mailed on May 2, 2025, by the European Patent Office as the International Searching Authority for current International Application No. PCT/US2025/020493—[15 pages].

* cited by examiner

*Primary Examiner* — Edward Zee

(57) ABSTRACT

Provided is a system (100) to enhance Personal Identification Number (PIN) security with hidden factors (271, 272, 273, 274) comprises a client agent (111) and a server agent (130). The client agent (111) manages a touchscreen or keypad, handles display layout, detects and tracks a finger movement on the touchscreen, and collects input entry of a PIN (311) from the finger movement based on hidden factors that configure use of the touchscreen or keypad, where the input entry (310) consists of an entered PIN, and information (312) on how the PIN was entered. The server agent (133) can be communicatively coupled to the client agent (111), and receives the input entry for the PIN, and validates the PIN that was entered in view of the information (312) on how the PIN was entered based on a policy configuration (410, 420, 430, 440) for the hidden factors for the input entry on said touchscreen or keypad. Other embodiments disclosed.

10 Claims, 9 Drawing Sheets

100

100

210

220

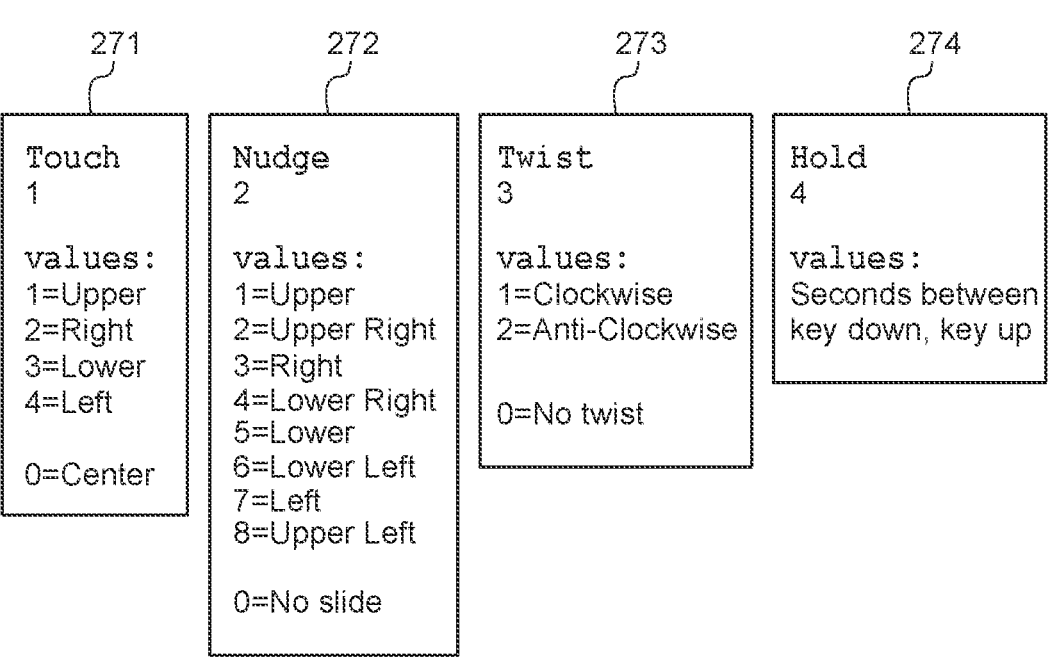

271

Touch
1 values:
1=Upper
2=Right
3=Lower
4=Left

0=Center

272

Nudge
2 values:
1=Upper
2=Upper Right
3=Right
4=Lower Right
5=Lower
6=Lower Left
7=Left
8=Upper Left 0=No slide

273

Twist
3 values:
1=Clockwise
2=Anti-Clockwise

0=No twist

274

Hold
4 values:
Seconds between
key down, key up

Fig. 2E

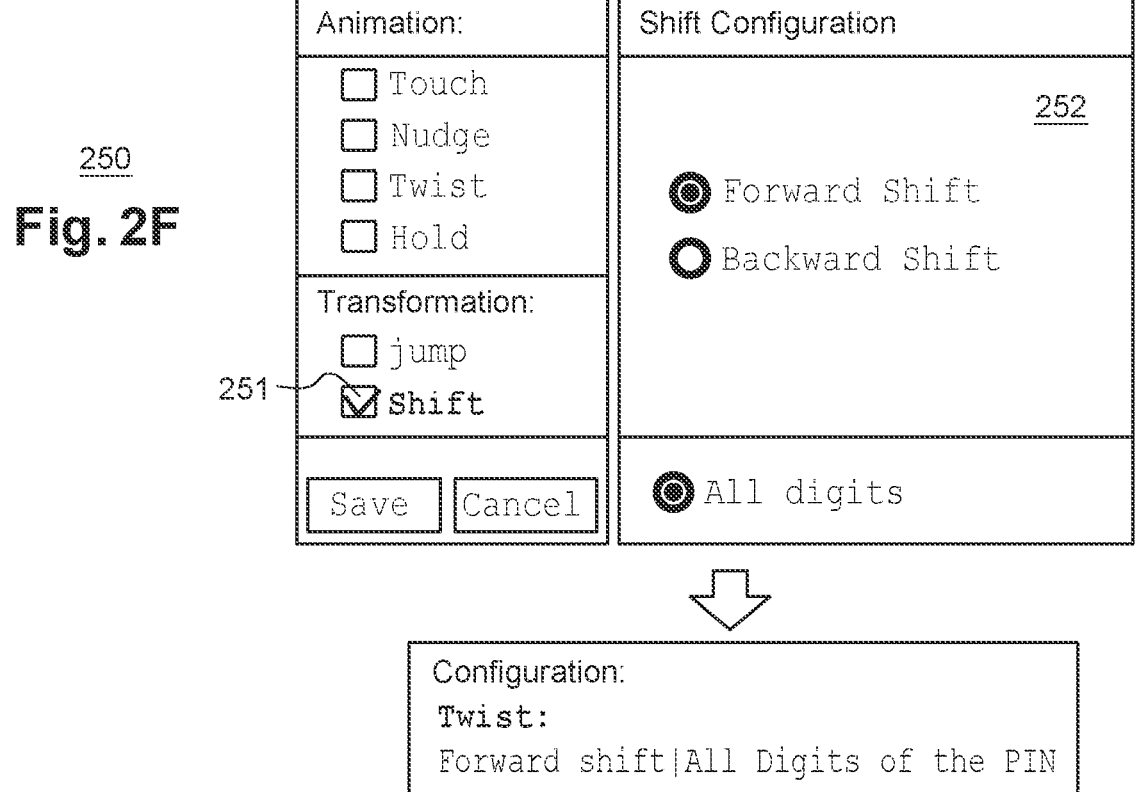

Animation:
☐ Touch
☐ Nudge
☐ Twist
☐ Hold

Transformation:
☐ jump
251 — ☑ Shift

Save   Cancel

Shift Configuration

252

◉ Forward Shift
◯ Backward Shift

◉ All digits

Configuration:
Twist:
Forward shift|All Digits of the PIN

410

420

Touch left and twist clockwise

Touch left and twist anti clockwise

Twist values:
1=Clockwise
2=Anti-Clockwise

0=No twist

430

Press 9 instead of 1

Press 3 instead of 7

440

500

STORAGE MEDIUM    600

COMPUTER EXECUTABLE
INSTRUCTIONS

602

COMPUTING PLATFORM 700

PROCESSING
COMPONENT

702

OTHER PLATFORM
COMPONENTS

704

STORAGE
MEDIUM

700

COMMUNICATIONS
INTERFACE

706

SYSTEM AND METHOD TO ENHANCE PIN SECURITY BY ADDING HIDDEN FACTORS

TECHNICAL FIELD

The present invention relates generally to electronic user interface systems and devices, and more particularly, to a touchscreen or keypad with improved security for entry of a Personal Identification Number (PIN) using additional hidden factors.

BACKGROUND

Most electronic devices include a keypad or touchscreen display for user interface input. Before the device allows access, it generally prompts the user for a password as a security feature to unlock the device for use. Examples of touchscreen or keypad entry include an Automatic Transaction Machine (ATM), payment or ticket kiosks, or any place a person use a laptop, phone, or any other electronic device in a public space, for example, to access a wi-fi network.

A shoulder surfing attack describes a situation where the attacker, usually in a public setting, can physically view the device screen and keypad to obtain personal information. It is s a type of social engineering technique used to obtain information such as personal identification numbers (PINs). May protective measures have been proposed to mitigate shoulder surfing, including, multi-factor authentication, biometrics, obfuscation overlays, privacy shields and sophisticated passwords. Some approaches to securing personal identification numbers (PINs) require two-factor authentication.

Multi-factor Authentication (MFA) is an authentication method that requires the user to provide two or more verification factors to gain access to a resource. With MFA, a user is granted access only after successfully presenting several separate pieces of evidence to an authentication mechanism—usually from at least two of the following three categories: knowledge—something one knows such as a password or personal identification number (PIN), possession—something one has such as a cryptographic identification device, smart card or secure token, and inherence—biometrics such as fingerprints, iris, face, palm print, etc. The goal of MFA is to create a layered defense and make it more difficult for an unauthorized person to access a target such as a physical location, computing device, network or database.

Even with multi-factor approaches, PINs and passwords are vulnerable to various password attacks especially in social public settings. Accordingly, a more secure means for unlocking a device, or entering PIN and Passwords is needed.

SUMMARY

In some embodiments a system to enhance Personal Identification Number (PIN) security with hidden factors comprises a client agent and a server agent. The client agent manages a touchscreen or keypad, handles display layout, detects and tracks a finger movement on the touchscreen, and collects input entry of a PIN from the finger movement based on hidden factors that configure use of the touchscreen or keypad, where the input entry consists of an entered PIN, and information on how the PIN was entered. The server agent can be communicatively coupled to the client agent, and receives the input entry for the PIN, and validates the PIN that was entered in view of the information on how the PIN was entered based on a policy configuration for the hidden factors for the input entry on said touchscreen or keypad. In some embodiments, the information on how the PIN was entered is collected and contained in the policy via configuration prompts that capture past user interaction directed to the hidden factors with an emulated touchscreen or keypad according to registered selections from an animation group or transformation group.

In some embodiments, the server agent assesses the hidden factors corresponding to the PIN entry relevant to personalized variations of said PIN entry in real-time by a user previously having configured the hidden factors for PIN entry on the device. In some embodiments the server agent revises a determination of the PIN entered in view of the information on how the PIN was entered according to the policy for hidden factors to produce a revised PIN, and presents the revised PIN as an actual PIN, and validates the actual PIN in place of the entered PIN, whereby the previously captured user interaction of hidden factors establishes how the user enters PIN characters within personalization bounds.

In some embodiment a device to enhance Personal Identification Number (PIN) security with hidden factors is provided. The device comprises a touchscreen with input entry for a PIN; and a client agent communicatively coupled to the touchscreen, wherein the client agent handles display layout, detects and tracks a finger movement on the touchscreen, collects input entry of a PIN from the finger movement based on hidden factors that configure use of the touchscreen or keypad, where the input entry consists of an entered PIN, and information on how the PIN was entered. The client agent sends the input entry to a server agent communicatively coupled to the client agent that receives the input entry for the PIN, and validates the PIN that was entered in view of the information on how the PIN was entered based on a policy configuration for the hidden factors for the input entry on said touchscreen or keypad.

In some embodiment a server agent is provided to enhance Personal Identification Number (PIN) security with hidden factors that is communicatively coupled to a client agent to receive input entry for a PIN, and validates the PIN that was entered in view of information on how the PIN was entered based on a policy configuration for the hidden factors for the input entry on a touchscreen or keypad. The client agent handles display layout, detects and tracks a finger movement on the touchscreen, collects input entry of the PIN from the finger movement based on hidden factors that configure use of the touchscreen or keypad, where the input entry consists of an entered PIN, and information on how the PIN was entered. Other embodiments disclosed.

BRIEF DESCRIPTION OF THE DRAWINGS

The accompanying drawings, which are incorporated in and constitute a part of this description, illustrate embodiments consistent with the invention and, together with the description, serve to explain the principles of the invention.

FIG. 2E illustrates charts for values of various features of an animation group of hidden factors in accordance with some embodiments.

FIG. 2F depicts an exemplary configuration prompt for enabling a shift feature and related parameters of a transformation group associated with a hidden factor in accordance with some embodiments;

Specific embodiments in this invention have been shown by way of example in the foregoing drawings and are hereinafter described in detail. The figures and written description are not intended to limit the scope of the inventive concepts in any manner. Rather, they are provided to illustrate the inventive concepts to a person skilled in the art by reference to particular embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Provided herein is a device, application and method to uniquely enter PIN data on a touch screen device in a manner not easily observed, or interpreted, by a shoulder surfer. It is a more secure manner of data entry that by way of hidden factors, protects entry of private and personal data, and is uniquely controlled by the user via a configurable prompt that can be tailored for each PIN or alphanumeric digit entry. These additional hidden factors are configurable to more securely enhance PIN entry, which provides indication not only of what the user knows regarding the PIN data, but also how the user engages with a touchscreen or keypad when entering PIN data. Like multi-factor authentication, it provides yet another factor, but one that is hidden. More notably, the user can selectively configure and personalize PIN entry by way of the hidden factors.

Figure 1:
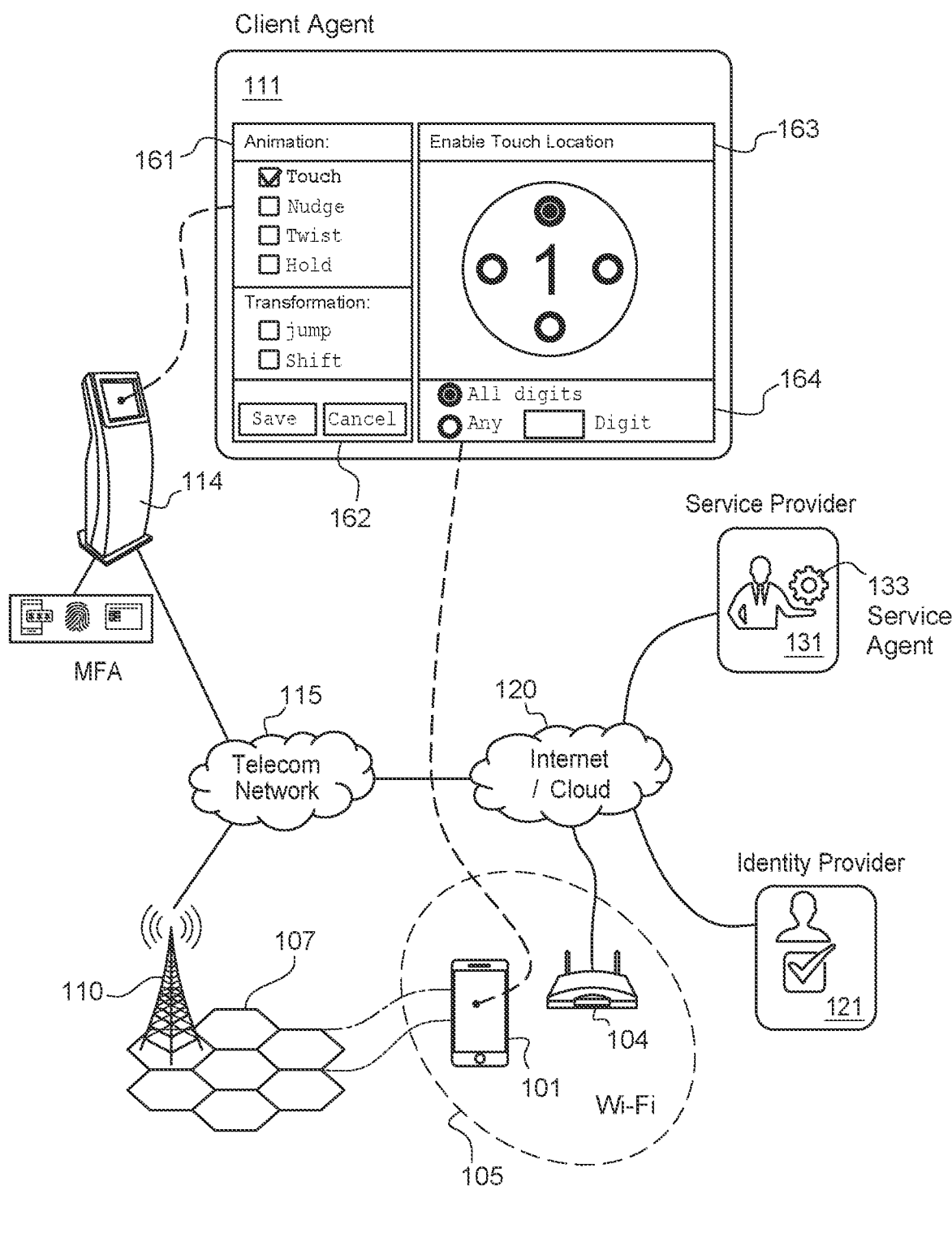
FIG. 1 illustrates an exemplary communication environment with devices configured for enhanced PIN security using hidden factors in accordance with some embodiments.

FIG. 1 illustrates an exemplary communication environment 100 with devices configured for enhanced PIN security using hidden factors in accordance with some embodiments. Example devices include the mobile device 101 and the kiosk terminal 114, each including a client agent 111 for configuring hidden factors associated with the entering of PIN information there on. The client agent 111 is communicatively coupled to a server agent 133, for example, executing on a service provider 131 or other server system. The keypad or touchscreen of a respective device (e.g. mobile 101, kiosk 114, etc.) includes a touch sensitive element or other touchscreen technology (e.g. resistive, electromagnetic, optical, capacitive, surface acoustic, etc.) Among other functions, it detects the various aspects of the touch event (e.g., location, pressure, duration, continuity, tracking, etc.) and the interprets how the touch event is determined based on preconfigured hidden factor settings as described ahead associated with how the data entry is performed by the user to further safeguard against the risk of shoulder surfing.

Hidden factors are associated with, and added to, one or more digits of the PIN, to enhance security of the credential entry system. This further complements standard PIN entry by adding information as to how the PIN is enabled 163 and how it should be evaluated. A user needs to know not only the PIN, but also know how the PIN characters need to be entered. Each digit of the PIN is configurable 164 with hidden factors detailing how the PIN digit is entered. These hidden factors consist of, but are not limited to, the following two broad categories: an animation group 161 and a transformation group 162. Between these two groups six hidden factor techniques are disclosed, though other techniques, or groups can also be contemplated and devised.

In some embodiments the environment 100 is extensible to an Identity and Access Management (IAM) ecosystem providing telecommunication, Internet and cloud services by way of an Identity Provider 121. For example, the client agent 111 can send data to the Identity Provider 121 to further authenticate the user with registered credentials, for example, to validate a PIN entry, stroke sequence, touch point, or other physical interactions and movements associated with the user's PIN entry style and preconfigured behaviors in addition with the hidden factors.

The communication environment 100 can include a telecommunication network 115 and an internet communication network (internet) 120. The telecommunication network 115 can provide a mobile communication link via base receiver 110 for wireless connectivity of a mobile device 102 from one or more cells 107. In one arrangement, the mobile device 102 can communicate over a Radio Frequency (RF) link with the base receiver 110 using a standard communication protocol such as legacy 2G (CDMA, GSM) and 3G, or LTE 4G and 5G. The base receiver 110, in turn, can connect the mobile device 102 to the internet 120 over a packet switched link. The internet can support application services and application service layers to provide media or content to the mobile device 102.

By way of the communication environment 100, the mobile device 102 can establish connections with a service provider 80 and identity provider 70 on the network and with other mobile devices to exchange information or to provide services such as audio, text messaging, media, audio, video, interactive applications, and the like. The service provider 80 can have access to a database that is stored locally or remotely and which can contain profile data. It can also host application services directly, or over the internet 120.

The mobile device 102 can also connect to the internet over a Wi-Fi or WLAN 105. Wireless Local Access Networks (WLANs) provide wireless access to the mobile communication environment within a local geographical area. WLANs can also complement loading on a cellular system, so as to increase capacity. Wi-Fi is the wireless technology used to connect computers, tablets, smartphones and other devices to the internet. The mobile device 102 can send and receive data to the service provider 80, identity provider 70 and other remote servers on the mobile communication environment. In one example, the mobile device 102 can send and receive audio, video, or other multimedia content from the database to these providers, for example, photos or licenses for identity proofing.

FIGS. 2A-2D depict exemplary configuration prompts for respectively enabling a touch, a nudge, a twist and a hold feature and related parameters of an animation group associated with a hidden factor in accordance with some embodiments. For these techniques in the animation group, a user enters the same PIN value but with subtle variations, as illustrated in each figure on how the actual PIN entry is done. The other group is called the transformation group, since it transforms the actual digit when entering it. For the techniques in this group, the user enters a different PIN value based on certain rules. These rules are listed as specific techniques as follows and shown.

Figure 2A:
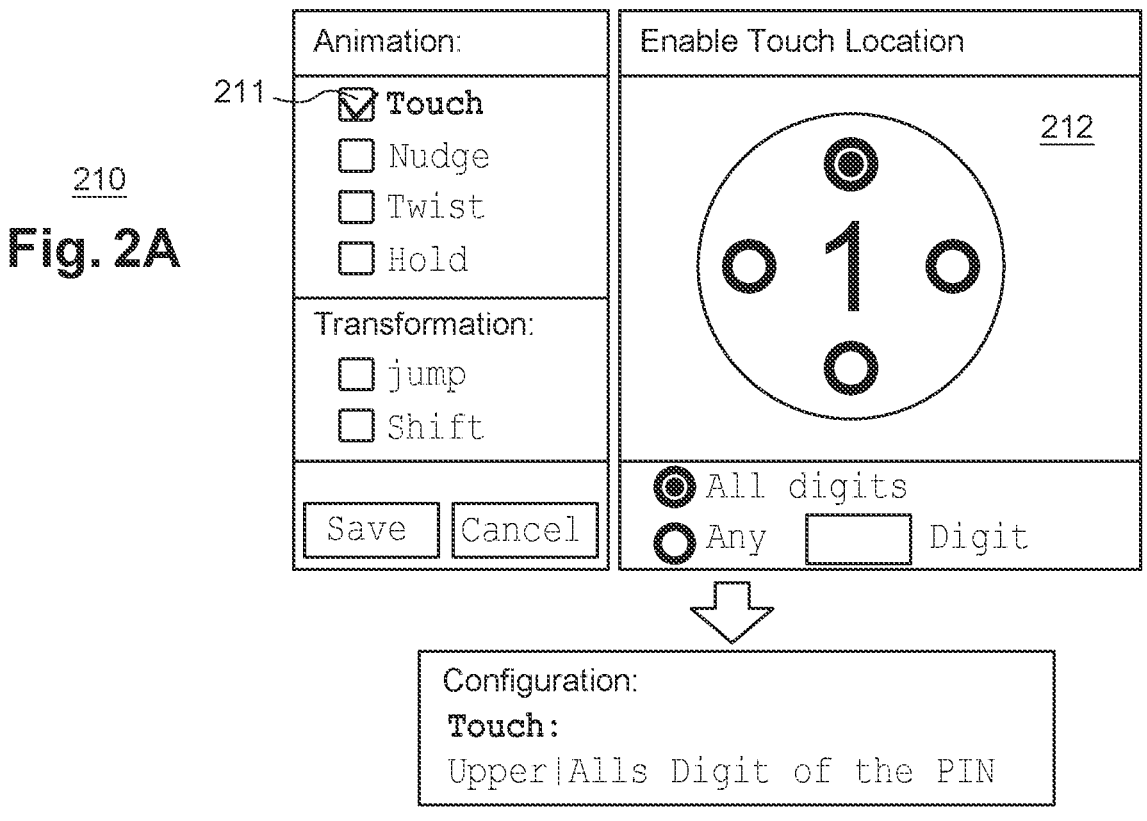
FIG. 2A depicts an exemplary configuration prompt for enabling a touch feature and related parameters of an animation group associated with a hidden factor in accordance with some embodiments.
Figure 4A:
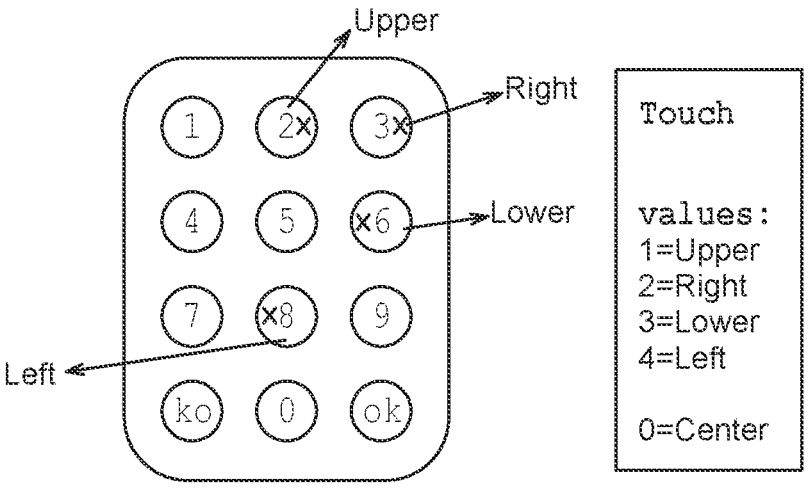
FIG. 4A illustrates an exemplary touchscreen configured for use with the touch feature and associated hidden factor values of FIG. 2A in accordance with some embodiments.

Referring now to FIG. 2A, registration of the touch entry 211 relies on the location 212 of where user touches the screen when entering PIN value with five possible locations when selecting an individual PIN entry: up, down, left, right or center. In this prompt, the user can select whether the server agent should recognize the touch and corresponding location for additional hidden factor validation of the PIN. FIG. 4A illustrates an exemplary touchscreen configured for use with the touch feature and associated hidden factor values in accordance with some embodiments.

Figure 2B:
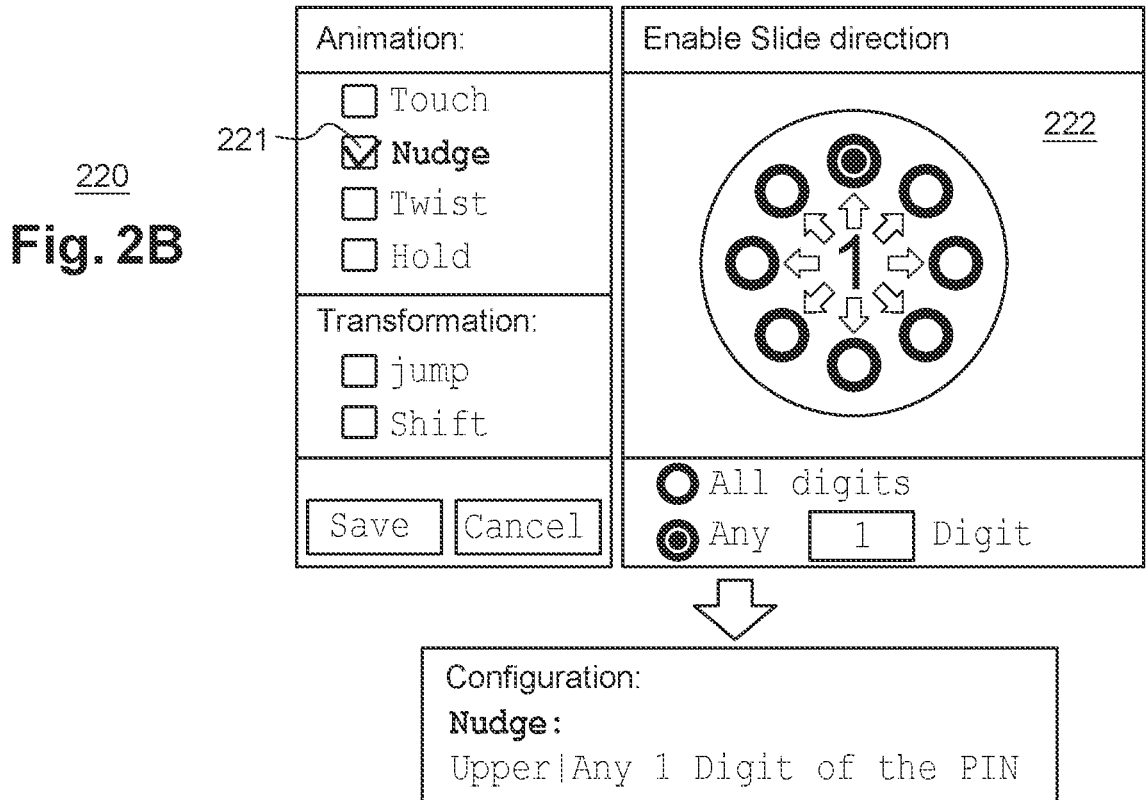
FIG. 2B depicts an exemplary configuration prompt for enabling a nudge feature and related parameters of an animation group associated with a hidden factor in accordance with some embodiments.
Figure 4B:
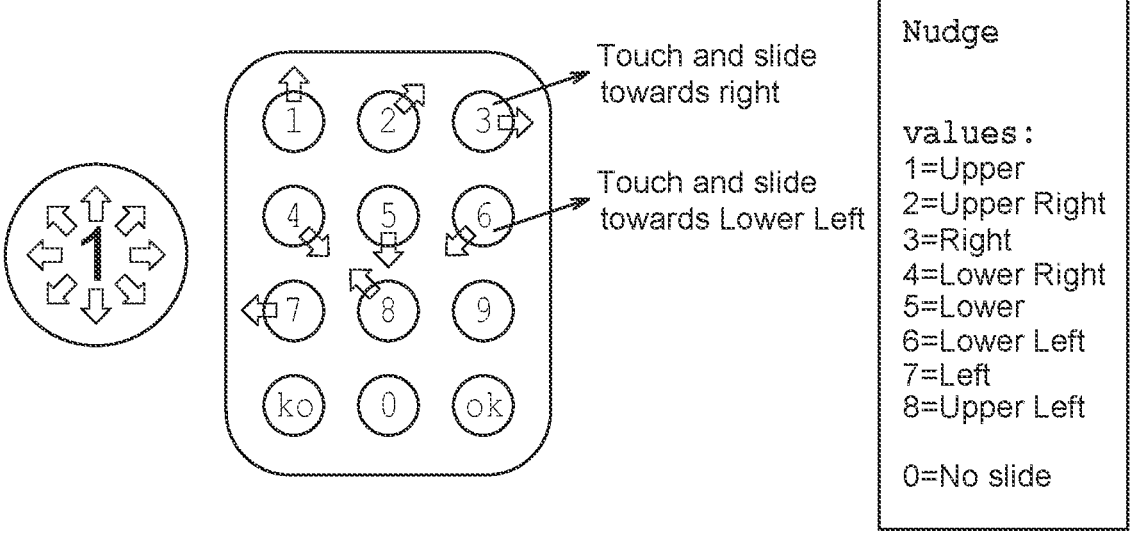
FIG. 4B illustrates an exemplary touchscreen configured for use with the nudge feature and associated hidden factor values of FIG. 2B in accordance with some embodiments.

As seen in FIG. 2B, registration of the nudge entry 221 relies on the direction 222 of a swipe after the user touches the screen when entering PIN value. Here, there are eight possibilities: up, down, left, right, plus four diagonals. In this prompt, the user can select whether the server agent should recognize the nudge and corresponding direction for additional hidden factor validation of the PIN. FIG. 4B illustrates an exemplary touchscreen configured for use with the nudge feature and associated hidden factor values in accordance with some embodiments.

Figure 2C:
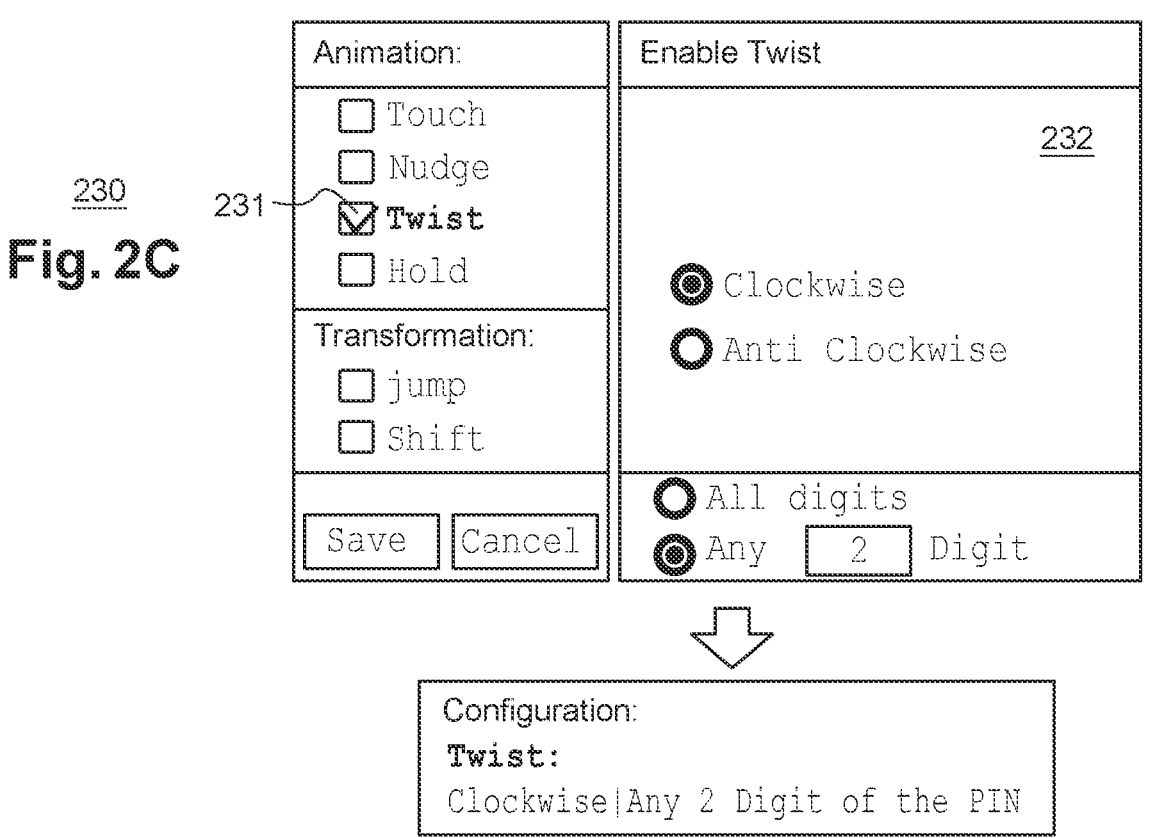
FIG. 2C depicts an exemplary configuration prompt for enabling a twist feature and related parameters of an animation group associated with a hidden factor in accordance with some embodiments.
Figure 4C:
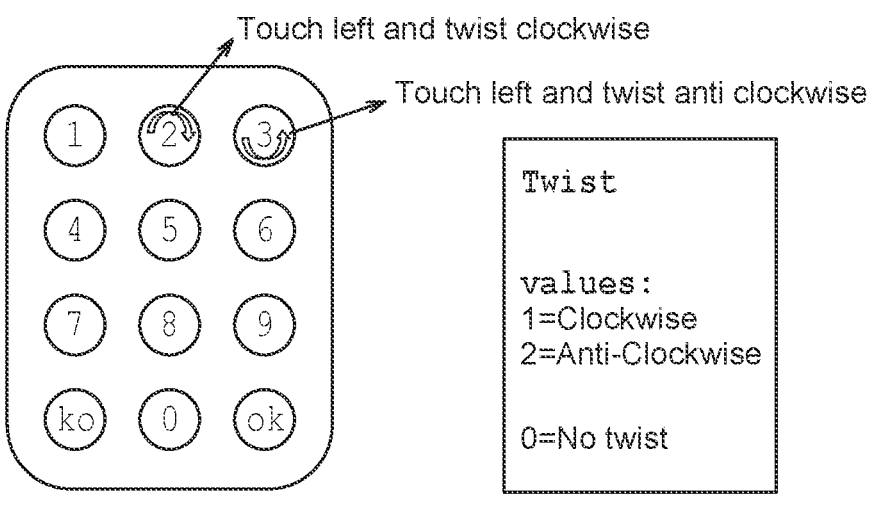
FIG. 4C illustrates an exemplary touchscreen configured for use with the twist feature and associated hidden factor values of FIG. 2C in accordance with some embodiments.

FIG. 2C depicts a configuration prompt for registration of the twist entry 231, which relies on the direction of static twisting of the finger after the user touches the screen when entering PIN value. Here, there are two possible directional configurations 232: clockwise and anti-clockwise. In this prompt, the user can select whether the server agent should recognize the twist and corresponding direction for additional hidden factor validation of the PIN. FIG. 4C illustrates an exemplary touchscreen configured for use with the twist feature and associated hidden factor values in accordance with some embodiments.

Figure 2D:
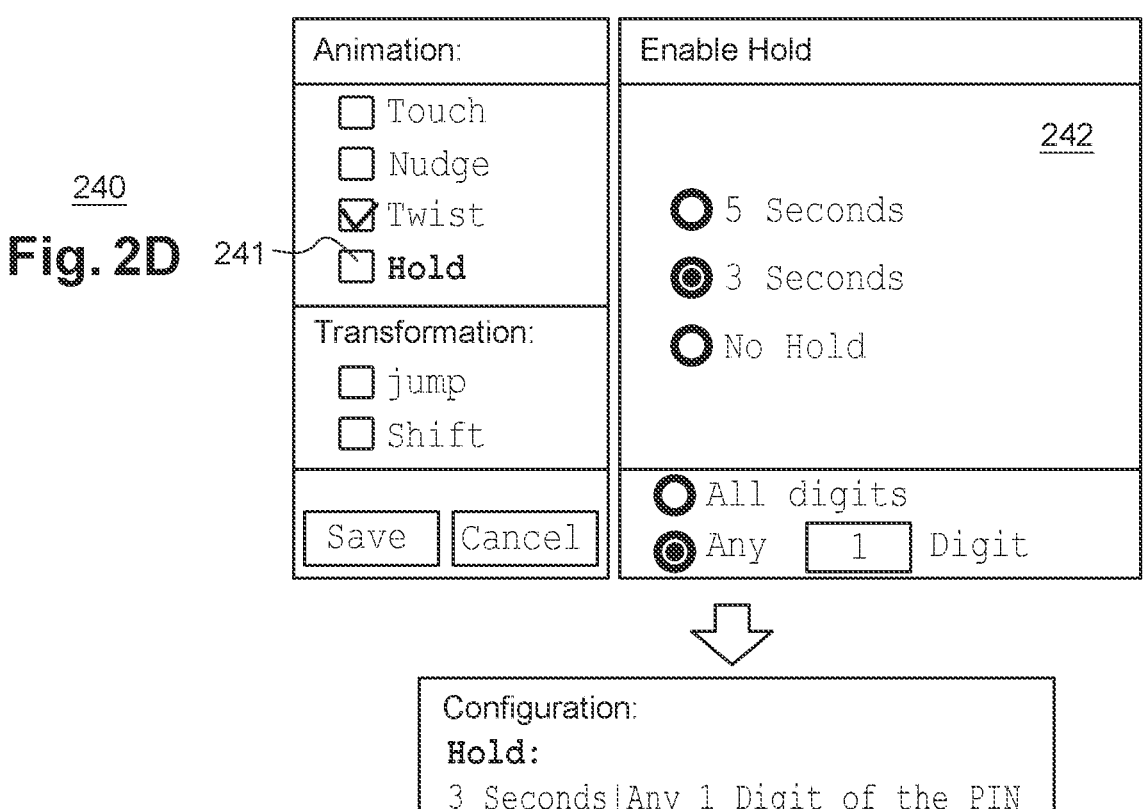
FIG. 2D depicts an exemplary configuration prompt for enabling a hold feature and related parameters of an animation group associated with a hidden factor in accordance with some embodiments.

FIG. 2D depicts a configuration prompt for registration of the hold entry 241, which relies on the duration of hold 242 after the user touches the screen when entering a PIN value. There are no pre-specified limit of the number of seconds the user holds the digit, but it is configured during setup, and can be applied individually, or a group. As one example, a user may stage out a 1 second delay for the entry of 4 digits, where the server agent validates after the first second, two second, three second and four second holds corresponding to entry of 4 PIN values.

Figure 4D:
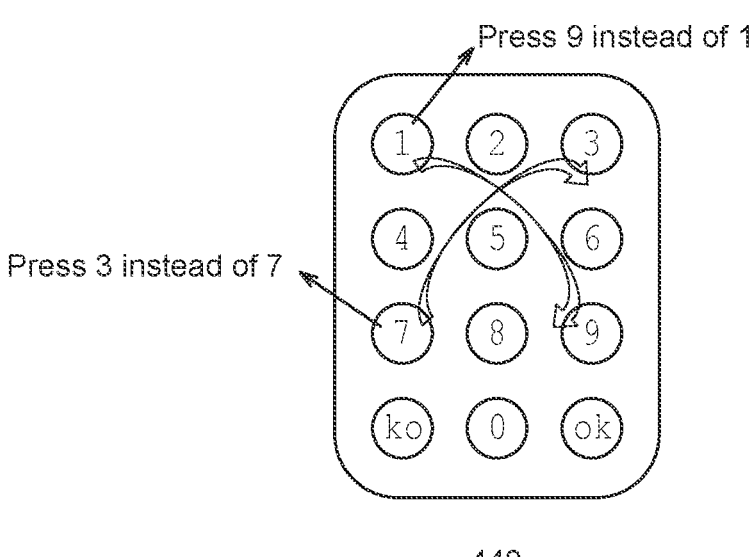
FIG. 4D illustrates an exemplary touchscreen configured for use with a jump feature and associated hidden factor values in accordance with some embodiments.

FIG. 4D illustrates an exemplary touchscreen configured for use with a jump feature and associated hidden factor values in accordance with some embodiments.

FIG. 2E illustrates charts 271-274 for values of various features of an animation group of hidden factors in accordance with some embodiments. For each configuration prompt shown in FIGS. 2A-2D and corresponding touchpad visual in FIGS. 4A-4C, the user can configure animation group technique used for entering PIN, since the actual value of PIN is already known by the user. Similarly, the user can configure additional techniques for the transformation group shown in FIG. 2F and FIG. 4D.

FIG. 2F depicts an exemplary configuration prompt for registering and enabling a shift feature 251 and related parameters for forward or backward shift 252 of a transformation group associated with a hidden factor. The shift technique provides a way to enter a different sequential number than the actual PIN value. A shift can also be backward, which means if value is 5, user must enter 4. If shift is configured as forward, and PIN value is 5, user must select 6. It is similar to +1 or −1 based on the type of forward or backward shift configuration. The hidden factors for transformation group for the shift can include sequential shift of digits of the PIN.

Similarly, the jump feature can be configured, wherein the user must select a different value which is chosen when they jump, for example, over keypad number 5. FIG. 4D illustrates an exemplary touchscreen configured for use with a jump feature and associated hidden factor values in accordance with some embodiments. For example, if the PIN value is 1, the user must select 9, which jumps over the 5 key. And, if the value is 8 users must select 2 to jump over the 5 key. If the value is 5 the user must select 0, since the jump is that key already, and vice versa. In this way, every number has an associated jump value. It is easy to remember the transformation values since user can visually "jump" over digit 5. A typical pin-pad is constructed like this. For each configuration prompt, the user can configure transformation group techniques used for entering PIN, since the actual value of PIN is already known by the user.

Figure 3A:
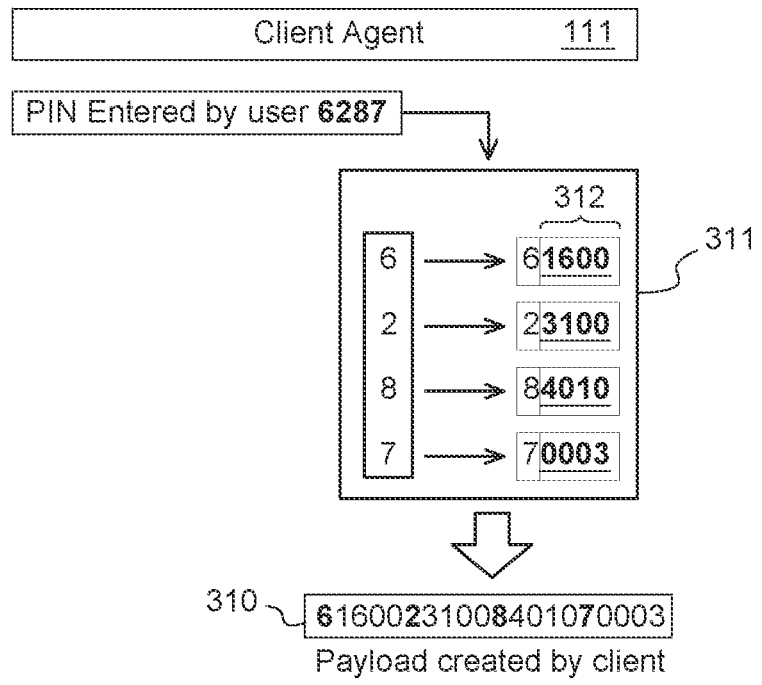
FIG. 3A depicts how a client agent constructs a payload packet from a PIN using hidden factors in accordance with some embodiments.

FIG. 3A depicts how the client agent 111 constructs a payload packet 310 for a PIN 311 using hidden factors in accordance with some embodiments, which is transmitted to the server agent 133 to validate PIN entry. Here, the packet 310 represents the input entry that consists of the entered PIN 311, and information (e.g., attributes 312) on how the PIN was entered. The client agent 111 collects all factors irrespective of what is configured by the user. With every key press, the client agent 111 collects the actual digit pressed and all respective animation factors; touch, nudge, twist, hold. In this example, the PIN entered by the user is 6287 with each digit entry of that PIN 311 having a corresponding attribute 312 seen as an appended four additional digit related to the configured parameter for that digit.

These four digit attributes 312 are recorded along with the respective animation techniques of touch, nudge, twist, and hold in this order. As such four additional digits are recorded for each entered digit.

As illustrated, the attributes for the PIN entry of 6827 are as follows. The first digit 6 is entered as: touch upper part of digit (1), nudge towards Lower Left (6), don't twist (0), and don't hold (0). This translates into a payload sequence of 61600. The second digit 2 is entered as: touch lower part of digit (3), nudge towards Upper (1), don't twist (0), and don't hold (0). This translates into a payload sequence of 23100. The third digit 8 is entered as: touch left part of digit (4), don't nudge (0), twist clockwise (1), and don't hold (0). This translates into a payload sequence of 84010. The fourth digit 7 is entered as: center part of digit (0), don't' nudge (0), don't twist (0), and hold for 3 seconds (3). This translates into a total payload sequence of 70003. The complete payload concentration of all four PIN digits 310 of the user entry is 61600231008401070003.

Figure 3B:
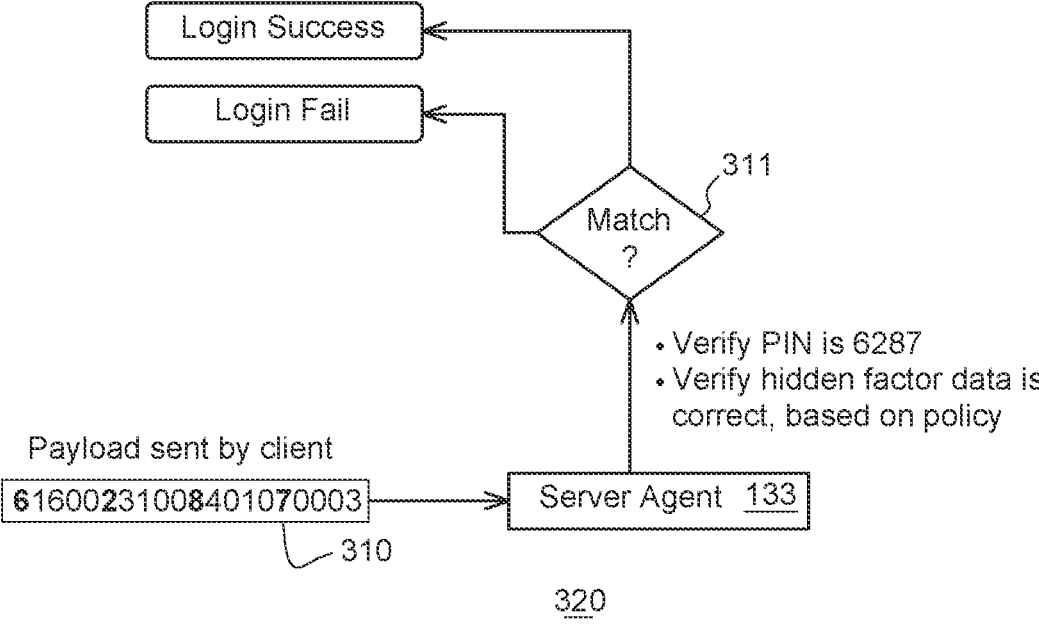
FIG. 3B illustrates a flow chart for how a server agent validates a payload packet from a client agent using hidden factors in accordance with some embodiments.

FIG. 3B illustrates a flow chart 320 for how a server agent 131 validates a payload packet 310 from a client agent 111 using hidden factors in accordance with some embodiments. Here, the server agent 131 or other authentication server, validates authentication payload to determine if it is correct as follows. It extracts the PIN value from the payload 310 sent by client agent 111, and then extract the hidden factor data from the same payload. It compares the PIN value to actual value, and then, based on user ID, or registered user identification information, fetches the hidden factor policy. It then compares the hidden factor data from payload to the hidden factor data in policy. If there is a match at decision step 381, the login will succeed. Otherwise, it does not validate the PIN for that user, and the login fails. The login can fail even if the PIN value entered was correct, but the hidden factor was not. This happens when the user enters the correct PIN value but does not respect the hidden factor policy.

Briefly, the client agent 111, server agent 131 and associated modules (e.g. Service Provider 131, Identity Provider 121, etc.) can include one or more processors and memory coupled to the one or more processors, wherein the memory includes computer instructions which when executed by the one or more processors causes the one or more processors to perform the method steps and operations described. They may be connected over the network to other machines via a network communication device interface. Dedicated hardware implementations including, but not limited to, application specific integrated circuits, programmable logic arrays and other hardware devices can likewise be constructed to implement the systems, devices and methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

Figure 5:
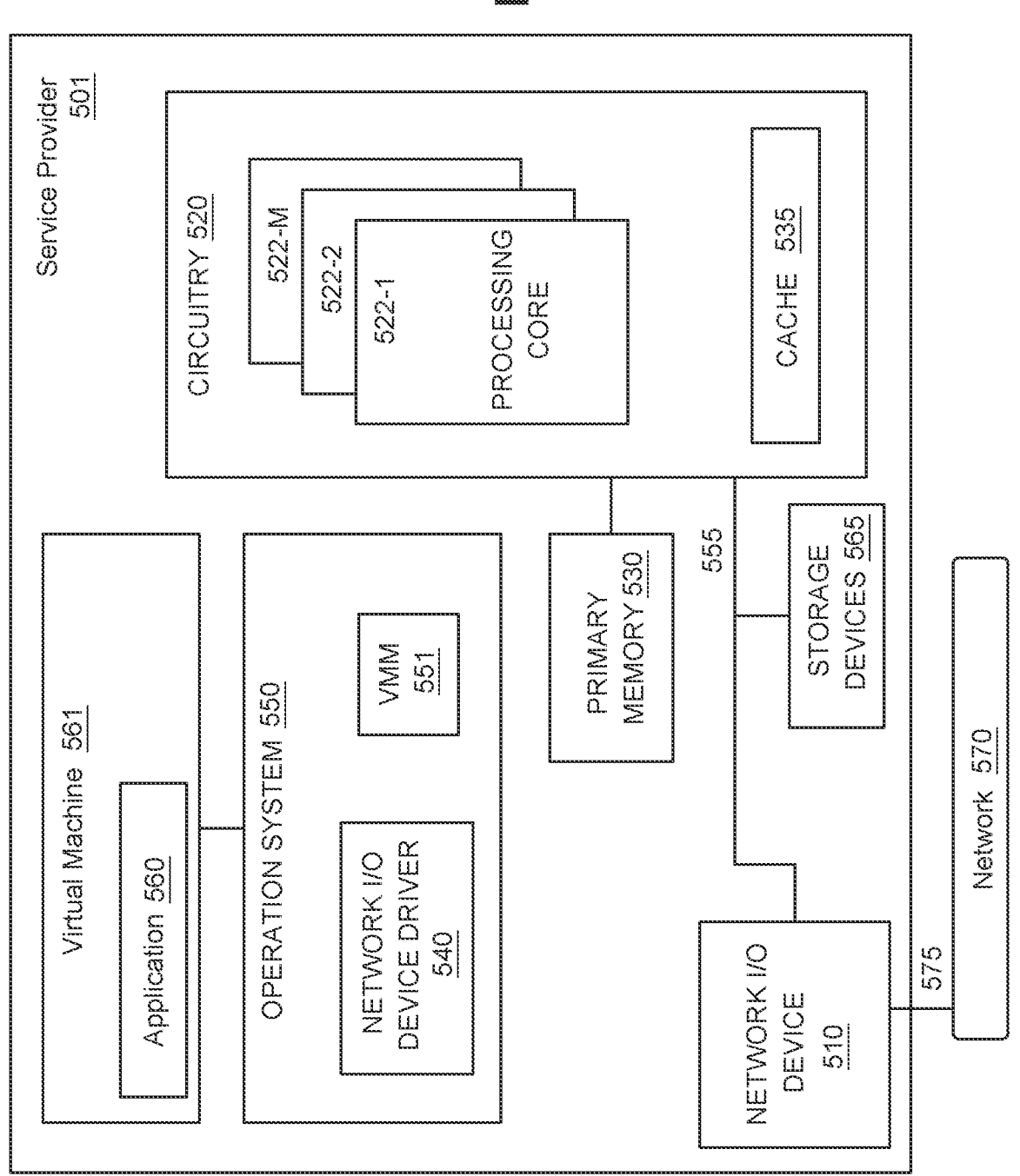
FIG. 5 illustrates an exemplary component block diagram of service provider in accordance with some embodiments.

FIG. 5 shows an exemplary service provider 501 (as seen in FIG. 1, that can represent other modules therein) that includes circuitry 520, primary memory 530, operating system (OS) 550, Network (NW) I/O device driver 540, virtual machine manager (VMM) (also known as a hypervisor) 551, at least one application 560 running in a virtual machine (VM) 561, and one or more storage devices 565. In one embodiment, OS 550 is Linux™. In another embodiment, OS 550 is Windows® Server. Other OSs may also be used. In an embodiment, application 560 comprises one or more of a cloud license manager service having one or more smart license automatic detach policies. Network I/O device driver 540 operates to initialize and manage I/O requests performed by network I/O device 510. In an embodiment, packets and/or packet metadata transmitted to network I/O device 510 and/or received from network I/O device 510 are stored in one or more of primary memory 530 and/or storage devices 565. In at least one embodiment, storage devices 565 may be one or more of hard disk drives (HDDs) and/or solid-state drives (SSDs). In an embodiment, storage devices 565 may be non-volatile memories (NVMs).

In some embodiments, the service provider 501 provides the infrastructure for the the the client agent 111 and server agent 131 in system 100 of FIG. 1 for enhancing PIN security with additional hidden factors, including, but not limited to, Kiosks, 114, mobile device 101, Bank Tellers, ATMs, Hardware Security Modules (HSMs), and other user input devices. In some examples, as shown in FIG. 5, circuitry 520 may communicatively couple to network I/O device 510 via communications link 555. In one embodiment, communications link 555 is a peripheral component interface express (PCIe) bus conforming to version 3.0 or other versions of the PCIe standard published by the PCI Special Interest Group (PCI-SIG). In some embodiments, the storage devices 565 is a disk storage for storing non-sensitive data such as the format preserving tokens representing date date, and associated encrypted data related to primary account numbers (PANs) or personally identifiable information (PII) associated with PIN entry.

In some examples, operating system 550, network I/O device driver 540, VM 561, and application 560 are implemented, at least in part, via cooperation between one or more memory devices included in primary memory 530 (e.g., volatile or non-volatile memory devices), storage devices 565, and elements of circuitry 520 such as processors with processing cores 522-1 to 522-*m*, where "m" is any positive whole integer greater than 2. In an embodiment, OS 550, VMM 551, network I/O device driver 540, VM 561 and application 560 are executed by one or more processing cores 522-1 to 522-*m*.

In some examples, service provider 501, includes but is not limited to a server, a server array or server farm, a web server, a network server, an Internet server, a work station, a mini-computer, a main frame computer, a supercomputer, a network appliance, a web appliance, a distributed computing system, multiprocessor systems, processor-based systems, a laptop computer, a tablet computer, a smartphone, a system-on-a-chip (SoC), or a combination thereof. In one example, service provider 501 is a disaggregated server. A disaggregated server is a server that breaks up components and resources into subsystems (e.g., network sleds). Disaggregated servers can be adapted to changing storage or compute loads as needed without replacing or disrupting an entire server for an extended period of time. A server could, for example, be broken into modular compute, I/O, power and storage modules that can be shared among other nearby servers.

Circuitry 520 having processing cores 522-1 to 522-*m* may include various commercially available processors, including without limitation Intel® Atom®, Celeron®, Core (2) Duo®, Core i: 3, 5, 7 and 9, Itanium®, Pentium®, Xeon® or Xeon Phi® processors, ARM processors, and similar processors. Circuitry 520 may include at least one cache 535 to store data.

According to some examples, primary memory 530 may be composed of one or more memory devices or dies which may include various types of volatile and/or non-volatile memory. Volatile types of memory may include, but are not limited to, dynamic random-access memory (DRAM), static random-access memory (SRAM), thyristor RAM (TRAM) or zero-capacitor RAM (ZRAIVI). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. In another embodiment, primary memory 530 may include one or more hard disk drives within and/or accessible by service provider 501.

Figures 6, 7:
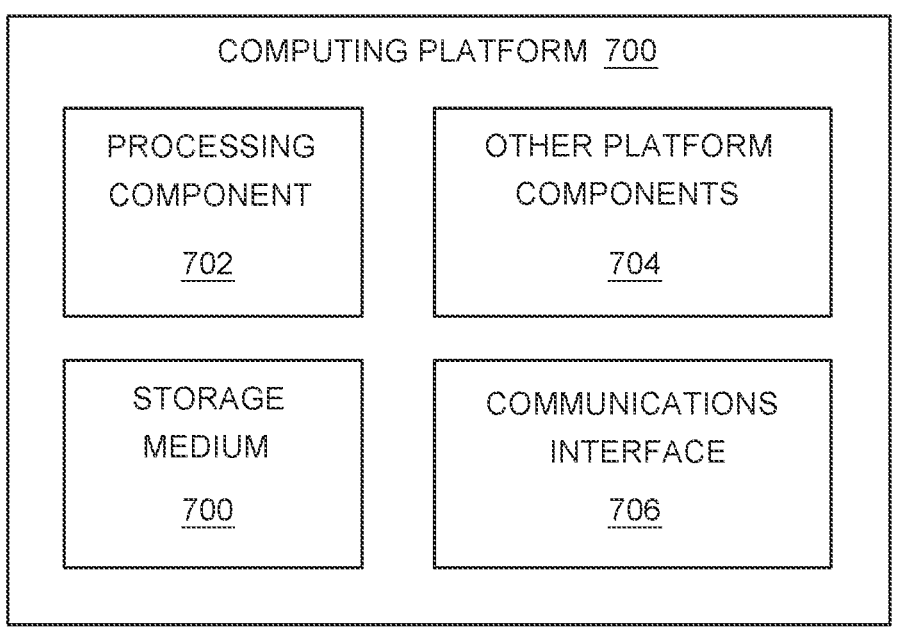
FIG. 6 illustrates an example of a storage medium suitable for use with persisting policy configurations in accordance with some embodiments.
FIG. 7 illustrates an example of a computing platform suitable for use with persisting policy configurations in accordance with some embodiments.

FIG. 6 illustrates an example of a storage medium 600 as may be required by the previously mentioned system components. Storage medium 600 may comprise an article of manufacture. In some examples, storage medium 600 may include any non-transitory computer readable medium or machine readable medium, such as an optical, magnetic or semiconductor storage. Storage medium 600 may store various types of computer executable instructions, such as instructions 602 to implement method steps and logic flows described in the above figures. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

In accordance with various embodiments of the present disclosure, the methods described herein are intended for operation as software programs running on a computer processor or integrated on-chip code within static memory. Furthermore, software implementations can include, but not limited to, distributed processing or component/object distributed processing, parallel processing, or virtual machine processing can also be constructed to implement the methods described herein.

FIG. 7 illustrates an example computing platform 700 as may be required by the previously mentioned system components. In some examples, computing platform 700 may include a processing component 702, other platform components 704 and/or a communications interface 706. According to some examples, processing component 702 may execute processing operations or logic for instructions stored on storage medium 600. Processing component 702 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 704 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), types of non-volatile memory such as 3-D cross-point memory that may be byte or block addressable. Non-volatile types of memory may also include other types of byte or block addressable non-volatile memory such as, but not limited to, multi-threshold level NAND flash memory, NOR flash memory, single or multi-level PCM, resistive memory, nanowire memory, FeTRAM, MRAM that incorporates memristor technology, STT-MRAM, or a combination of any of the above. Other types of computer readable and machine-readable storage media may also include magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 706 may include logic and/or features to support a communication interface. For these examples, communications interface 706 may include one or more communication interfaces that operate according to various communication protocols or standards to communicate over direct or network communication links or channels. Direct communications may occur via use of communication protocols or standards described in one or more industry standards (including progenies and variants) such as those associated with the peripheral component interconnect express (PCIe) specification. Network communications may occur via use of communication protocols or standards such those described in one or more Ethernet standards promulgated by the Institute of Electrical and Electronics Engineers (IEEE). For example, one such Ethernet standard may include IEEE 802.3. Network communication may also occur according to one or more OpenFlow specifications such as the OpenFlow Switch Specification.

The components and features of computing platform 700, including logic represented by the instructions stored on storage medium 600 may be implemented using any combination of discrete circuitry, ASICs, logic gates and/or single chip architectures. Further, the features of computing platform 700 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

In some embodiments, the data-centric system 100 of FIG. 1 is technically enabled by way of one or more computing platforms 700. It should be appreciated that the exemplary computing platform 700 shown in the block diagram of FIG. 7 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

What is claimed is:

1. A system to enhance Personal Identification Number (PIN) security with hidden factors, the system comprising:
    one or more processors and memory operatively coupled to the one or more processors, wherein the memory includes computer instructions which when executed by the one or more processors causes the one or more processors to implement:
    a client agent for a touchscreen or keypad that handles display layout, detects and tracks a finger movement on the touchscreen, and collects an input entry of a PIN from the finger movement based on the hidden factors that configure use of the touchscreen or keypad, where the input entry consists of the PIN that was entered, and information on how the PIN was entered, and
    a server agent communicatively coupled to the client agent that receives the input entry for the PIN, and validates the PIN that was entered in view of the information on how the PIN was entered based on a policy configuration for the hidden factors for the input entry on said touchscreen or keypad,
    wherein the hidden factors comprise a finger action belonging to a transformation group consisting of a jump and a shift, and
    wherein the hidden factors for the transformation group includes sequential shift of digits of the PIN.

2. The system of claim 1, wherein the information on how the PIN was entered is collected and contained in the policy via configuration prompts that captured past user interaction directed to the hidden factors with an emulated touchscreen or keypad according to registered selections from an animation group or transformation group.

3. The system of claim 2, wherein the server agent assesses the hidden factors corresponding to the PIN entry relevant to personalized variations of said PIN entry in real-time by a user previously having configured the hidden factors for entry of the PIN on the client agent.

4. The system of claim 1, wherein the hidden factors comprise a finger action belonging to an animation group consisting of a touch, a nudge, a twist and a hold.

5. The system of claim 1, wherein the hidden factors for an animation group for touch include upper, right, lower, left and center.

6. The system of claim 1, wherein the hidden factors for an animation group for nudge include upper, upper right, right, lower right, lower, lower left, left and upper left.

7. The system of claim 1, wherein the hidden factors for an animation group for twist include clockwise and anti-clockwise.

8. The system of claim 1, wherein the hidden factors for a transformation group for jump include an over-the-keypad action.

9. The system of claim 1, wherein the hidden factors for an animation group for hold implicitly includes a duration component comprising time as measured by a timer.

10. A system to enhance Personal Identification Number (PIN) security with hidden factors, the system comprising:
    one or more processors and memory operatively coupled to the one or more processors, wherein the memory includes computer instructions which when executed by the one or more processors causes the one or more processors to implement:
    a client agent for a touchscreen or keypad that handles display layout, detects and tracks a finger movement on the touchscreen, and collects an input entry of a PIN from the finger movement based on the hidden factors that configure use of the touchscreen or keypad, where the input entry consists of the PIN that was entered, and information on how the PIN was entered, and
    a server agent communicatively coupled to the client agent that receives the input entry for the PIN, and validates the PIN that was entered in view of the information on how the PIN was entered based on a policy configuration for the hidden factors for the input entry on said touchscreen or keypad,
    wherein the server agent
    revises a determination of the PIN that was entered in view of the information on how the PIN was entered according to the policy for the hidden factors to produce a revised PIN;
    presents the revised PIN as an actual PIN, and validates the actual PIN in place of the PIN that was entered,
    whereby previously captured user interaction of the hidden factors establishes how the user enters characters of the PIN within personalization bounds.

* * * * *